US010284384B2

United States Patent
Chen

(10) Patent No.: US 10,284,384 B2
(45) Date of Patent: May 7, 2019

(54) STANDBY METHOD, INTELLIGENT HOME DEVICE, AND STANDBY SYSTEM

(71) Applicant: Huawei Technologies Co., Ltd., Shenzhen (CN)

(72) Inventor: Jian Chen, Shanghai (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 432 days.

(21) Appl. No.: 15/276,509

(22) Filed: Sep. 26, 2016

(65) Prior Publication Data

US 2017/0012795 A1 Jan. 12, 2017

Related U.S. Application Data

(63) Continuation of application No. PCT/CN2014/089689, filed on Oct. 28, 2014.

(30) Foreign Application Priority Data

Mar. 27, 2014 (CN) .......................... 2014 1 0119569

(51) Int. Cl.
*G06F 15/16* (2006.01)
*H04L 12/28* (2006.01)
(Continued)

(52) U.S. Cl.
CPC ........ *H04L 12/2816* (2013.01); *G05B 19/042* (2013.01); *H04L 12/12* (2013.01);
(Continued)

(58) Field of Classification Search
CPC .................................................... G06F 1/3209
See application file for complete search history.

(56) References Cited

U.S. PATENT DOCUMENTS 10,136,060 B2 * 11/2018 Liu .......................... H04L 43/10
2003/0061319 A1 * 3/2003 Manzardo ............... H04L 67/14
709/221

(Continued)

FOREIGN PATENT DOCUMENTS

CN      101771866 A     7/2010
CN      101953117 A     1/2011
(Continued)

*Primary Examiner* — Hieu T Hoang

(57) ABSTRACT

Embodiments of the present invention provide a standby method, an intelligent home device, and a standby system, relate to the communications field, and implement standby of the intelligent home device that has a simple process and does not need participation of a third-party server. The method used in the embodiments of the present invention includes: receiving, by a first intelligent home device, a standby indication message sent by a second intelligent home device; keeping in communication with a third-party server corresponding to an intelligent service application of the second intelligent home device; and if a first service request sent by the third-party server is received, sending a wake-up request to the second intelligent home device according to the first service request and a preset correspondence, to wake up the second intelligent home device. The present invention is applied to standby of the intelligent home device.

20 Claims, 5 Drawing Sheets

(51) Int. Cl.
  *H04L 12/12* (2006.01)
  *G05B 19/042* (2006.01)
  *H04L 29/12* (2006.01)
  *G06F 1/3209* (2019.01)
  *H04M 7/00* (2006.01)

(52) U.S. Cl.
  CPC .................. *H04L 61/6068* (2013.01); *G05B 2219/25286* (2013.01); *G05B 2219/2613* (2013.01); *G05B 2219/2642* (2013.01); *G06F 1/3209* (2013.01); *H04M 7/006* (2013.01); *Y02D 50/20* (2018.01); *Y02D 50/40* (2018.01); *Y02D 50/42* (2018.01)

(56) References Cited

U.S. PATENT DOCUMENTS

2006/0265473 A1* 11/2006 Muto .................... G06F 1/3203
  709/218
2007/0027976 A1* 2/2007 Sasame ............... H04L 12/1868
  709/223
2013/0036417 A1* 2/2013 Chen ..................... G06F 9/5077
  718/1
2013/0212413 A1* 8/2013 Berndt .................. G06F 1/3203
  713/310
2014/0259188 A1* 9/2014 Forrest .................... H04L 63/04
  726/29
2015/0264124 A1* 9/2015 Kuo ........................ G06F 1/266
  709/204

FOREIGN PATENT DOCUMENTS

| | | | |
|---|---|---|---|
| CN | 102186112 A | | 9/2011 |
| CN | 102340700 A | * | 2/2012 |
| CN | 102340700 A | | 2/2012 |
| CN | 102497600 A | | 6/2012 |
| CN | 102761465 A | | 10/2012 |
| CN | 202907120 U | | 4/2013 |
| CN | 103095535 A | | 5/2013 |
| CN | 103905213 A | | 7/2014 |
| EP | 2381695 A2 | | 10/2011 |

* cited by examiner

STANDBY METHOD, INTELLIGENT HOME DEVICE, AND STANDBY SYSTEM

CROSS-REFERENCE TO RELATED APPLICATIONS

This application is a continuation of International Application No. PCT/CN2014/089689, filed on Oct. 28, 2014, which claims priority to Chinese Patent Application No. 201410119569.X, filed on Mar. 27, 2014. The disclosures of the aforementioned applications are hereby incorporated by reference in their entireties.

TECHNICAL FIELD

The present invention relates to the communications field, and in particular, to a standby method, an intelligent home device, and a standby system.

BACKGROUND

With development of science and technology, an intelligent operating system is widely applied to home devices, so that the home devices are increasingly intelligent and support more service applications, such as a smart television, a smart set top box, and a network camera. In addition to providing original services, the intelligent home devices have a large quantity of intelligent services, such as a communication service, a remote download service, a real-time communication service, and a video call service.

When an intelligent home device is in a standby state, a main central processing unit (CPU) inside the intelligent home device is in an entirely sleep state, so as to reduce power consumption. In this case, the intelligent home device can respond only to infrared key information, and a large quantity of background applications of intelligent service applications provided by the intelligent home device cannot provide services, such as receiving of a push video and photo and an incoming call of a video call service, which results in poor user experience of an intelligent service application that runs on the intelligent home device.

To acquire better user experience of the intelligent service application, the intelligent home device needs to receive a background push and an incoming call in real time, and when being in the standby state, the intelligent home device still needs to ensure that the CPU is in a working mode. In this case, the intelligent home device works in a relatively high power consumption mode.

To resolve a contradiction between user experience of an intelligent service application of an intelligent home device and power consumption of the intelligent home device that is in a standby state, some intelligent home devices implement remote wake-up by supporting network standby. Network standby means: In a wired mode, an intelligent home device is connected to a home local area network by using a fast Ethernet (FE) interface or a Gigabit Ethernet (GE) interface; when the intelligent home device is in a standby state, and an intelligent service application has a background push and an incoming call, a special wake-up packet is sent by using a network interface to wake up the intelligent home device, so as to provide the intelligent service application. In this way, when the intelligent home device is not in use, the intelligent home device enters the standby state; when the intelligent service application has the background push and an incoming call, the intelligent home device can quickly return to a working state, thereby achieving an objective of obtaining good user experience of the intelligent service application provided by the intelligent home device and implementing power saving of the intelligent home device at the same time.

In the standby process of the foregoing intelligent home device, the inventor finds that the prior art has at least the following disadvantages: Although network standby achieves the objective of obtaining good user experience of the intelligent service application provided by the intelligent home device and implementing power saving of the intelligent home device at the same time, implementation of a network standby process is complex. Not only port forwarding needs to be set at a home gateway, but also participation of a third-party server is required. For example, the special wake-up packet is sent by using the third-party server, the third-party server provides a specialized remote wake-up service, and the third-party server records or forwards a Media Access Control (MAC) address of the intelligent home device.

SUMMARY

Embodiments of the present invention provide a standby method, an intelligent home device, and a standby system, and implement standby of the intelligent home device that has a simple process and does not need participation of a third-party server.

To achieve the foregoing objective, the technical solutions used in the embodiments of the present invention are as follows:

According to a first aspect, a standby method is provided and is applied to a first intelligent home device, where the method includes:

receiving a standby indication message sent by a second intelligent home device;

keeping in communication with a third-party server corresponding to an intelligent service application of the second intelligent home device; and if a first service request sent by the third-party server is received, sending a wake-up request to the second intelligent home device according to the first service request and a preset correspondence, to wake up the second intelligent home device, where the first service request includes a service identifier of a first intelligent service application and a port number corresponding to the first intelligent service application, the first intelligent service application is an intelligent service application that runs on the second intelligent home device, and the preset correspondence includes a service identifier of at least one intelligent service application, a port number corresponding to the at least one intelligent service application, and an Internet Protocol (IP) address of an intelligent home device corresponding to the intelligent service application.

With reference to the first aspect, in a first possible implementation manner of the first aspect, the sending a wake-up request to the second intelligent home device according to the first service request and a preset correspondence, to wake up the second intelligent home device includes:

querying the preset correspondence according to the service identifier of the first intelligent service application and the port number corresponding to the first intelligent service application that are included in the first service request, so as to acquire, from the preset correspondence, an IP address of the second intelligent home device that is corresponding to the service identifier of the first intelligent service application and the port number corresponding to the first intelligent service application; and sending the wake-up request to the second intelligent home device according to the IP address of the second intelligent home device, to wake up the second intelligent home device.

With reference to the first aspect or the first possible implementation manner of the first aspect, in a second possible implementation manner of the first aspect, the standby indication message includes:

the IP address of the second intelligent home device, a service identifier of at least one intelligent service application, and a port number corresponding to the at least one intelligent service application; and correspondingly, the method further includes:

saving, into the preset correspondence, the IP address of the second intelligent home device, the service identifier of the at least one intelligent service application, and the port number corresponding to the at least one intelligent service application that are included in the standby indication message.

With reference to the second possible implementation manner of the first aspect, in a third possible implementation manner of the first aspect, the keeping in communication with a third-party server corresponding to an intelligent service application of the second intelligent home device includes:

keeping, according to the standby indication message, in communication with a third-party server corresponding to the intelligent service application that is corresponding to the service identifier of the intelligent service application and the port number corresponding to the intelligent service application that are included in the standby indication message.

With reference to the first aspect or the first possible implementation manner of the first aspect, in a fourth possible implementation manner of the first aspect, before the receiving a standby indication message sent by a second intelligent home device, the method further includes:

receiving a standby agent request message sent by the second intelligent home device, where the standby agent request message includes the IP address of the second intelligent home device, a service identifier of at least one intelligent service application, and a port number corresponding to the at least one intelligent service application; and saving, into the preset correspondence, the IP address of the second intelligent home device, the service identifier of the at least one intelligent service application, and the port number corresponding to the at least one intelligent service application that are included in the standby agent request message.

With reference to the fourth possible implementation manner of the first aspect, in a fifth possible implementation manner of the first aspect, the keeping in communication with a third-party server corresponding to an intelligent service application of the second intelligent home device includes:

keeping, according to the standby agent request message, in communication with a third-party server corresponding to the intelligent service application that is corresponding to the service identifier of the intelligent service application and the port number corresponding to the intelligent service application that are included in the standby agent request message.

With reference to the first aspect or any one of the first possible implementation manner of the first aspect to the fifth possible implementation manner of the first aspect, in a sixth possible implementation manner of the first aspect, the method further includes:

receiving a turn-on indication message sent by the second intelligent home device; and ending communication with the third-party server corresponding to the intelligent service application of the second intelligent home device.

According to a second aspect, a standby method is provided and is applied to a second intelligent home device, where the method includes:

acquiring an IP address of a first intelligent home device by means of automatic discovery;

receiving a standby request entered by a user;

sending a standby indication message to the first intelligent home device according to the IP address of the first intelligent home device, so that the first intelligent home device keeps in communication with a third-party server corresponding to an intelligent service application of the second intelligent home device;

switching from a working state to a standby state according to the standby request;

receiving a wake-up request sent by the first intelligent home device; and switching from the standby state to the working state according to the wake-up request.

With reference to the second aspect, in a first possible implementation manner of the second aspect, the standby indication message includes:

an IP address of the second intelligent home device, a service identifier of at least one intelligent service application, and a port number corresponding to the at least one intelligent service application.

With reference to the second aspect, in a second possible implementation manner of the second aspect, before the sending a standby indication message to the first intelligent home device according to the IP address of the first intelligent home device, the method further includes:

sending a standby agent request message to the first intelligent home device, where the standby agent request message includes an IP address of the second intelligent home device, a service identifier of at least one intelligent service application, and a port number corresponding to the at least one intelligent service application.

With reference to the second aspect, the first possible implementation manner of the second aspect, or the second possible implementation manner of the second aspect, in a third possible implementation manner of the second aspect, the method further includes:

sending a turn-on indication message to the first intelligent home device.

According to a third aspect, a first intelligent home device is provided, where the first intelligent home device includes:

a receiving unit, configured to receive a standby indication message sent by a second intelligent home device;

a communications unit, configured to keep in communication with a third-party server corresponding to an intelligent service application of the second intelligent home device, where the receiving unit is further configured to receive a service request sent by the third-party server; and a sending unit, configured to: if a first service request sent by the third-party server is received, send a wake-up request to the second intelligent home device according to the first service request and a preset correspondence, to wake up the second intelligent home device, where the first service request includes a service identifier of a first intelligent service application and a port number corresponding to the first intelligent service application, the first intelligent service application is an intelligent service application that runs on the second intelligent home device, and the preset correspondence includes a service identifier of at least one intelligent service application, a port number corresponding to the at least one intelligent service application, and an IP address of an intelligent home device corresponding to the intelligent service application.

With reference to the third aspect, in a first possible implementation manner of the third aspect, the sending unit is specifically configured to:

query the preset correspondence according to the service identifier of the first intelligent service application and the port number corresponding to the first intelligent service application that are included in the first service request received by the receiving unit, so as to acquire, from the preset correspondence, an IP address of the second intelligent home device corresponding to the service identifier of the first intelligent service application and the port number corresponding to the first intelligent service application; and send the wake-up request to the second intelligent home device according to the IP address of the second intelligent home device, to wake up the second intelligent home device.

With reference to the third aspect or the first possible implementation manner of the third aspect, in a second possible implementation manner of the third aspect, the standby indication message includes:

the IP address of the second intelligent home device, a service identifier of at least one intelligent service application, and a port number corresponding to the at least one intelligent service application; and correspondingly, the first intelligent home device further includes:

a saving unit, configured to save, into the preset correspondence, the IP address of the second intelligent home device, the service identifier of the at least one intelligent service application, and the port number corresponding to the at least one intelligent service application that are included in the standby indication message.

With reference to the second possible implementation manner of the third aspect, in a third possible implementation manner of the third aspect, the communications unit is specifically configured to:

keep, according to the standby indication message, in communication with a third-party server corresponding to the intelligent service application that is corresponding to the service identifier of the intelligent service application and the port number corresponding to the intelligent service application that are included in the standby indication message.

With reference to the third aspect or the first possible implementation manner of the third aspect, in a fourth possible implementation manner of the third aspect, the receiving unit is further configured to:

receive a standby agent request message sent by the second intelligent home device, where the standby agent request message includes the IP address of the second intelligent home device, a service identifier of at least one intelligent service application, and a port number corresponding to the at least one intelligent service application; and the first intelligent home device further includes:

a saving unit, configured to save, into the preset correspondence, the IP address of the second intelligent home device, the service identifier of the at least one intelligent service application, and the port number corresponding to the at least one intelligent service application that are included in the standby agent request message received by the receiving unit.

With reference to the fourth possible implementation manner of the third aspect, in a fifth possible implementation manner of the third aspect, the communications unit is specifically configured to:

keep, according to the standby agent request message, in communication with a third-party server corresponding to the intelligent service application that is corresponding to the service identifier of the intelligent service application and the port number corresponding to the intelligent service application that are included in the standby agent request message.

With reference to the third aspect or any one of the first possible implementation manner of the third aspect to the fifth possible implementation manner of the third aspect, in a sixth possible implementation manner of the third aspect, the receiving unit is further configured to receive a turn-on indication message sent by the second intelligent home device; and the communications unit is further configured to end communication with the third-party server corresponding to the intelligent service application of the second intelligent home device.

According to a fourth aspect, a second intelligent home device is provided, where the second intelligent home device includes:

an acquiring unit, configured to acquire an IP address of a first intelligent home device by means of automatic discovery;

a receiving unit, configured to receive a standby request entered by a user;

a sending unit, configured to send a standby indication message to the first intelligent home device according to the IP address of the first intelligent home device; and a switching unit, configured to switch from a working state to a standby state according to the standby request received by the receiving unit, where the receiving unit is further configured to receive a wake-up request sent by the first intelligent home device; and the switching unit is further configured to switch from the standby state to the working state according to the wake-up request received by the receiving unit.

With reference to the fourth aspect, in a first possible implementation manner of the fourth aspect, the standby indication message includes:

an IP address of the second intelligent home device, a service identifier of at least one intelligent service application, and a port number corresponding to the at least one intelligent service application.

With reference to the fourth aspect, in a second possible implementation manner of the fourth aspect, the sending unit is further configured to:

send a standby agent request message to the first intelligent home device, where the standby agent request message includes an IP address of the second intelligent home device, a service identifier of at least one intelligent service application, and a port number corresponding to the at least one intelligent service application.

According to a fifth aspect, a standby system is provided, where the standby system includes:

at least one first intelligent home device according to the third aspect and any one of the foregoing possible implementation manners; and at least one second intelligent home device according to the fourth aspect and any one of the foregoing possible implementation manners.

With reference to the fifth aspect, in a first possible implementation manner of the fifth aspect, the second intelligent home device is connected to the first intelligent home device by using an FE or GE interface; or the second intelligent home device is connected to the first intelligent home device by using a WiFi interface; or the first intelligent home device is integrated with an infrared remote control or 2.4G wireless remote control function, and the second intelligent home device is connected to the first intelligent home device by using the infrared remote control or 2.4G wireless remote control function.

According to the standby method, the intelligent home device, and the standby system that are provided by the present invention, a first intelligent home device receives a standby indication message sent by a second intelligent home device; keeps in communication with a third-party server corresponding to an intelligent service application of the second intelligent home device; and if receiving a first service request sent by the third-party server, sends awake-up request to the second intelligent home device according to the first service request and a preset correspondence, to wake up the second intelligent home device. The first service request includes a service identifier of a first intelligent service application and a port number corresponding to the first intelligent service application. The first intelligent service application is an intelligent service application that runs on the second intelligent home device. The preset correspondence includes a service identifier of at least one intelligent service application, a port number corresponding to the at least one intelligent service application, and an Internet Protocol IP address of an intelligent home device corresponding to the intelligent service application. Standby of an intelligent home device that has a simple process and does not need participation of a third-party server is implemented, thereby overcoming a defect in the prior art that implementation of network standby of an intelligent home device is complex and needs participation of a third-party server.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
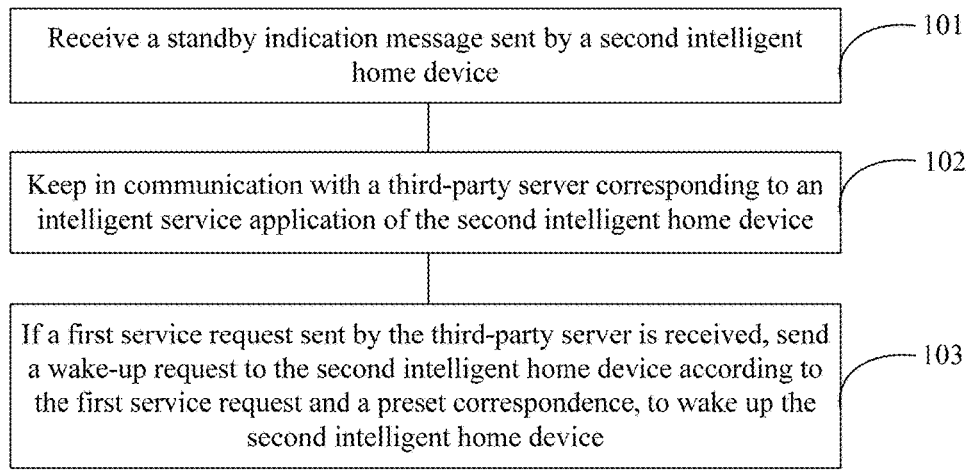
FIG. 1 is a schematic flowchart of a standby method according to an embodiment of the present invention.

Embodiment 1 of the present invention provides a standby method, applied to a first intelligent home device. Referring to FIG. 1, the method may include the following steps:

101. Receive a standby indication message sent by a second intelligent home device.

It should be noted that the first intelligent home device may be an intelligent home gateway or any intelligent home device that has a gateway function in a home network. A type of the first intelligent home device is not specifically limited by the present invention.

The second intelligent home device is any one of all intelligent home devices that are connected to the first intelligent home device.

It should be noted that an intelligent home device described in all embodiments of the present invention may be a smart television or a smart set top box in a home local area network, or may be a network camera or the like in a home local area network, which is not specifically limited in the embodiments of the present invention and shall fall within the protection scope of the present invention.

The standby indication message is sent by the second intelligent home device and is used to notify the first intelligent home device that the second intelligent home device is to switch to a standby state soon, and that the first intelligent home device needs to enter a waiting state and prepare to keep in communication with a third-party server corresponding to an intelligent service application of the second intelligent home device.

An intelligent service application is an intelligent service provided by an intelligent home device and may include a real-time communication service, a video call service, a Voice over Internet Protocol service, and the like. A type of the intelligent service application is not specifically limited by the present invention.

102. Keep in communication with a third-party server corresponding to an intelligent service application of the second intelligent home device.

The third-party server corresponding to the intelligent service application of the second intelligent home device is a service provider of the intelligent service application of the second intelligent home device. The third-party server may include a server in a real-time communication service, may include a mobile phone terminal in a screen shifting service, or may include a third-party server corresponding to another intelligent service application, which is not specifically limited by the present invention.

Keeping in communication with the third-party server corresponding to the intelligent service application of the second intelligent home device is performed according to a service identifier of the intelligent service application of the second intelligent home device and a port number corresponding to the intelligent service application.

Content of keeping in communication with the third-party server corresponding to the intelligent service application of the second intelligent home device varies with manners in which the first intelligent home device obtains the intelligent service application of the second intelligent home device.

Specifically and optionally, according to the manners in which the first intelligent home device obtains the intelligent service application of the second intelligent home device, the first intelligent home device may keep in communication with the third-party server corresponding to the intelligent service application of the second intelligent home device in any one of the following three manners:

Manner 1: In a home network, a service identifier of an intelligent service application of the second intelligent home device and a port number corresponding to the intelligent service application are manually entered by a user as a preset correspondence of the first intelligent home device when the home network is created. After the first intelligent home device receives the standby indication message sent by the second intelligent home device, the first intelligent home device starts to keep in communication with a third-party server of each intelligent service application of the second intelligent home device according to the preset correspondence.

Manner 2: The standby indication message that is sent by the second intelligent home device and is received by the first intelligent home device includes an IP address of the second intelligent home device, a service identifier of at least one intelligent service application, and a port number corresponding to the at least one intelligent service application. After the first intelligent home device receives the standby indication message sent by the second intelligent home device, the first intelligent home device may keep, according to the IP address of the second intelligent home device, the service identifier of the at least one intelligent service application, and the port number corresponding to the at least one intelligent service application that are included in the standby indication message, in communication with a third-party server corresponding to the intelligent service application that is corresponding to the service identifier of the intelligent service application and the port number corresponding to the intelligent service application that are included in the standby indication message.

It should be noted that in manner 2, the first intelligent home device agents a related service according to the service identifier of the intelligent service application and the port number corresponding to the intelligent service application that are included in the standby indication message; the standby indication message may include some intelligent service applications of the second intelligent home device, or may include all applications of the second intelligent home device, which is not specifically limited by the present invention; a specific quantity of intelligent service applications of the second intelligent home device that are included in the standby indication message may be determined according to actual requirements.

Manner 3: Before sending the standby indication message, the second intelligent home device sends a standby agent request message to the first intelligent home device, where the standby agent request message includes an IP address of the second intelligent home device, a service identifier of at least one intelligent service application, and a port number corresponding to the at least one intelligent service application. After the first intelligent home device receives the standby indication message sent by the second intelligent home device, the first intelligent home device keeps, according to the standby agent request message, in communication with a third-party server corresponding to the intelligent service application that is corresponding to the service identifier of the intelligent service application and the port number corresponding to the intelligent service application that are included in the standby agent request message.

The standby agent request message is sent in advance by the second intelligent home device to the first intelligent home device, where the standby agent request message is used to instruct the first intelligent home device to perform agenting according to the received standby agent request message when the second intelligent home device notifies the first intelligent home device that the second intelligent home device enters a standby state.

It should be noted that in manner 3, the first intelligent home device agents a related service according to the service identifier of the intelligent service application and the port number corresponding to the intelligent service application that are included in the standby agent request message. The standby agent request message may include some intelligent service applications of the second intelligent home device, or may include all applications of the second intelligent home device, which is not specifically limited by the present invention. A specific quantity of intelligent service applications of the second intelligent home device that are included in the standby agent request message may be determined according to actual requirements.

103. If a first service request sent by the third-party server is received, send a wake-up request to the second intelligent home device according to the first service request and a preset correspondence, to wake up the second intelligent home device.

The first service request includes a service identifier of a first intelligent service application and a port number corresponding to the first intelligent service application. The first intelligent service application is any one of intelligent service applications that run on the second intelligent home device. The preset correspondence includes a service identifier of at least one intelligent service application, a port number corresponding to the at least one intelligent service application, and an IP address of an intelligent home device corresponding to the intelligent service application.

After the first intelligent home device keeps in communication with the third-party server corresponding to the intelligent service application of the second intelligent home device, the first intelligent home device rather than the second intelligent home device that is in a standby state receives a service request sent by the third-party server.

That the first intelligent home device sends, if receiving the first service request sent by the third-party server, the wake-up request to the second intelligent home device according to the first service request and the preset correspondence, to wake up the second intelligent home device may specifically include:

querying the preset correspondence according to the service identifier of the first intelligent service application and the port number corresponding to the first intelligent service application that are included in the first service request, so as to acquire, from the preset correspondence, an IP address of the second intelligent home device that is corresponding to the service identifier of the first intelligent service application and the port number corresponding to the first intelligent service application; and sending the wake-up request to the second intelligent home device according to the IP address of the second intelligent home device, to wake up the second intelligent home device.

It should be noted that the preset correspondence is a correspondence, stored in the first intelligent home device, among an intelligent home device, a service identifier of an intelligent service application, and a port number corresponding to the intelligent service application. The preset correspondence may exist in a table form in the first intelligent home device. Referring to Table 1, a preset correspondence is shown and includes a service identifier of at least one intelligent service application, a port number corresponding to the at least one intelligent service application, and an IP address of an intelligent home device corresponding to the intelligent service application.

TABLE 1

| IP address of an intelligent home device | Service identifier of an intelligent service application | Port number of an intelligent service application |
| --- | --- | --- |
| 192.168.1.3 | X | 5 |
| 192.168.1.3 | Y | 9 |
| 192.168.1.8 | Z | 15 |
| 192.168.1.13 | W | 23 |
| ... | ... | ... |

It may be seen from Table 1 that service identifier X corresponds to port number 5, and service identifier Y corresponds to port number 9. Both an intelligent service application corresponding to service identifier X and an intelligent service application corresponding to service identifier Y are provided by an intelligent home device of which an IP address is 192.168.1.3. It should be noted that Table 1 only exemplarily illustrates content and a form of the preset correspondence. Certainly, the preset correspondence may also exist in another form in the first intelligent home device, and the content of the preset correspondence may also be determined according to actual requirements. The form and the content of the preset correspondence are not specifically limited in all embodiments of the present invention.

It should be noted that Table 1 illustrates a service identifier of an intelligent service application only by using an exemplary form, which does not represent that the service identifier of the intelligent service application is limited.

The content of the preset correspondence may be obtained in any one of the following three manners:

Manner 1: A service identifier of an intelligent service application of the second intelligent home device and a port number corresponding to the intelligent service application are manually entered by a user as a preset correspondence of the first intelligent home device when a home network is created.

Manner 2: The standby indication message sent by the second intelligent home device includes an IP address of the second intelligent home device, a service identifier of at least one intelligent service application, and a port number corresponding to the at least one intelligent service application. After receiving the standby indication message, the first intelligent home device saves, into the preset correspondence, the IP address of the second intelligent home device, the service identifier of the at least one intelligent service application, and the port number corresponding to the at least one intelligent service application that are included in the standby indication message.

Manner 3: Before sending the standby indication message, the second intelligent home device sends a standby agent request message to the first intelligent home device, where the standby agent request message includes an IP address of the second intelligent home device, a service identifier of at least one intelligent service application, and a port number corresponding to the at least one intelligent service application. After receiving the standby agent request message, the first intelligent home device saves, into the preset correspondence, the IP address of the second intelligent home device, the service identifier of the at least one intelligent service application, and the port number corresponding to the at least one intelligent service application that are included in the standby agent request message.

Further, sending the wake-up request to the second intelligent home device to wake up the second intelligent home device may be different according to a connection manner between the second intelligent home device and the first intelligent home device or according to a function that the first intelligent home device has.

Specifically, sending the wake-up request to the second intelligent home device to wake up the second intelligent home device may be implemented in any one of the following three manners:

Manner 1: If the second intelligent home device is connected to the first intelligent home device by using an FE or GE interface, a wake-up packet is sent to the second intelligent home device according to a standby protocol, to wake up the second intelligent home device.

The wake-up packet may include six consecutive bytes of FF and consecutive 16 repetitions of a MAC address.

It should be noted that content of the wake-up packet is determined according to an actually used standby protocol, which is not specifically limited by the present invention.

Manner 2: If the second intelligent home device is connected to the first intelligent home device by using a WiFi interface, a wake-up request is sent to the second intelligent home device by using a network wake-up function of a WiFi standard protocol, to wake up the second intelligent home device.

Manner 3: If the first intelligent home device is integrated with an infrared remote control or 2.4G wireless remote control function, a wake-up request is sent to the second intelligent home device by using an analog remote control corresponding to the infrared remote control or 2.4G wireless remote control function, to wake up the second intelligent home device.

Further, the method may further include:

receiving a turn-on indication message sent by the second intelligent home device; and ending communication with the third-party server corresponding to the intelligent service application of the second intelligent home device.

The turn-on indication message is sent by the second intelligent home device, is corresponding to the standby indication message, and is used to notify the first intelligent home device that the second intelligent home device has switched to a working state, the first intelligent home device does not need to keep in communication with the third-party server corresponding to the intelligent service application of the second intelligent home device, and the first intelligent home device needs to end a network heartbeat service with the third-party server corresponding to the intelligent service application of the second intelligent home device.

According to the standby method provided by the present invention, a first intelligent home device receives a standby indication message sent by a second intelligent home device; keeps in communication with a third-party server corresponding to an intelligent service application of the second intelligent home device; and if receiving a first service request sent by the third-party server, sends a wake-up request to the second intelligent home device according to the first service request and a preset correspondence, to wake up the second intelligent home device. The first service request includes a service identifier of a first intelligent service application and a port number corresponding to the first intelligent service application. The first intelligent service application is an intelligent service application that runs on the second intelligent home device. The preset correspondence includes a port number of at least one intelligent service application and an IP address of an intelligent home device corresponding to the intelligent service application. Standby of an intelligent home device that has a simple process and does not need participation of a third-party server is implemented, thereby overcoming a defect in the prior art that implementation of network standby of an intelligent home device is complex and needs participation of a third-party server.

Embodiment 2

Figure 2:
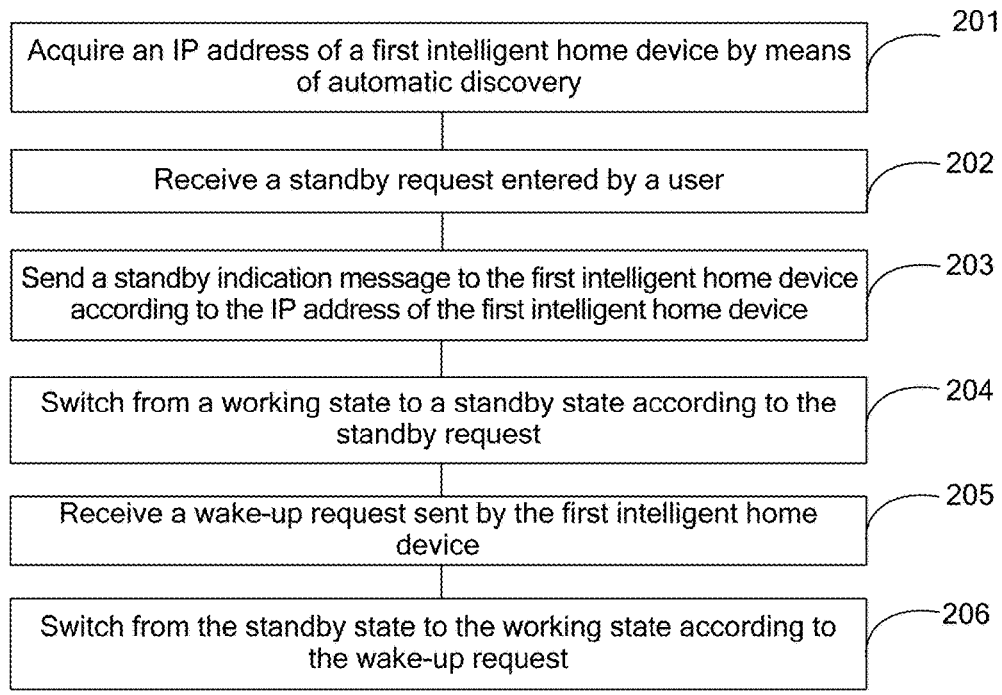
FIG. 2 is a schematic flowchart of another standby method according to an embodiment of the present invention.

Embodiment 2 of the present invention provides another standby method, applied to a second intelligent home device. Referring to FIG. 2, the method may include the following steps:

201. Acquire an IP address of a first intelligent home device by means of automatic discovery.

It should be noted that the first intelligent home device may be an intelligent home gateway or any intelligent home device that has a gateway function. A type of the first intelligent home device is not specifically limited by the present invention.

The second intelligent home device is any one of all intelligent home devices that are connected to the first intelligent home device.

It should be noted that an intelligent home device described in all embodiments of the present invention may be a smart television or a smart set top box in a home local area network, or may be a network camera or the like in a home local area network, which is not specifically limited in the embodiments of the present invention and shall fall within the protection scope of the present invention.

Automatic discovery between the second intelligent home device and the first intelligent home device may be implemented by using the Universal Plug and Play (UPNP) protocol, and the second intelligent home device may acquire the IP address of the first intelligent home device.

It should be noted that automatic discovery between the second intelligent home device and the first intelligent home device may also be implemented by using a proprietary protocol. A method for implementing automatic discovery between the second intelligent home device and the first intelligent home device is not specifically limited by the present invention. Any method for acquiring the IP address of the first intelligent home device by means of automatic discovery shall fall within the protection scope of the present invention.

202. Receive a standby request entered by a user.

The standby request is request information that is sent, by a user who uses the second intelligent home device, when the second intelligent home device is not used temporarily, by triggering an on/off button of a remote control corresponding to the second intelligent home device or by triggering an on-off button of the second intelligent home device.

203. Send a standby indication message to the first intelligent home device according to the IP address of the first intelligent home device.

After the second intelligent home device receives in step 202 the standby request entered by the user, the second intelligent home device needs to send the standby indication message to the first intelligent home device according to the IP address of the first intelligent home device that is acquired in step 201, so that the first intelligent home device keeps in communication with a third-party server corresponding to an intelligent service application of the second intelligent home device.

The standby indication message is used to notify the first intelligent home device that the second intelligent home device is to switch to a standby state soon, and that the first intelligent home device needs to enter a waiting state and prepare to keep in communication with the third-party server corresponding to the intelligent service application of the second intelligent home device.

Optionally, the standby indication message may include an IP address of the second intelligent home device, a service identifier of at least one intelligent service application, and a port number corresponding to the at least one intelligent service application.

A service identifier of an intelligent service application and a port number corresponding to the intelligent service application that are included in the standby indication message are a service identifier of and a port number corresponding to an intelligent service application that is entrusted by the second intelligent home device to the first intelligent home device for agenting. The first intelligent home device may agent all intelligent service applications of the second intelligent home device, or may agent some, which is not specifically limited by the present invention and may be determined according to actual requirements.

204. Switch from a working state to a standby state according to the standby request.

The second intelligent home device switches from the working state to the standby state after the second intelligent home device sends the standby indication message to the first intelligent home device in step 203.

Certainly, the second intelligent home device may also switch from the working state to the standby state after sending the standby indication message to the first intelligent home device and receiving feedback information sent by the first intelligent home device.

It should be noted that after sending the standby indication message, whether the second intelligent home device immediately switches from the working state to the standby state or switches from the working state to the standby state after receiving the feedback information sent by the first intelligent home device may be set according to actual requirements, which is not specifically limited by the present invention.

Certainly, if the second intelligent home device switches from the working state to the standby state after sending the standby indication message to the first intelligent home device and receiving the feedback information sent by the first intelligent home device, correspondingly, the first intelligent home device needs to send the feedback information to the second intelligent home device after receiving the standby indication message sent by the second intelligent home device.

The standby state indicates a state that an intelligent home device is powered on but does not perform any substantive work, and in the standby state, a master CPU is in a sleep state, which may achieve an objective of reducing power consumption of a device when being idle.

205. Receive a wake-up request sent by the first intelligent home device.

The wake-up request sent by the first intelligent home device may be different according to a connection manner between the second intelligent home device and the first intelligent home device or according to a function that the first intelligent home device has.

Specifically, receiving the wake-up request sent by the first intelligent home device may be implemented in any one of the following three manners:

Manner 1: A wake-up packet sent by the first intelligent home device according to a standby protocol is received if the second intelligent home device is connected to the first intelligent home device by using an FE or GE interface.

The wake-up packet may include six consecutive bytes of FF and consecutive 16 repetitions of a MAC address.

It should be noted that content of the wake-up packet is determined according to an actually used standby protocol, which is not specifically limited by the present invention.

Manner 2: A wake-up request sent by the first intelligent home device by using a network wake-up function of a WiFi standard protocol is received if the second intelligent home device is connected to the first intelligent home device by using a WiFi interface.

Manner 3: A wake-up request sent by the first intelligent home device by using an analog remote control corresponding to an infrared remote control or 2.4G wireless remote control function is received if the first intelligent home device is integrated with the infrared remote control or 2.4G wireless remote control function.

206. Switch from the standby state to the working state according to the wake-up request.

Optionally, before the standby indication message is sent to the first intelligent home device according to the IP address of the first intelligent home device, the method may further include:

sending a standby agent request message to the first intelligent home device, where the standby agent request message may include an IP address of the second intelligent home device, a service identifier of at least one intelligent service application, and a port number corresponding to the at least one intelligent service application.

Further, the method may further include:

sending a turn-on indication message to the first intelligent home device.

The turn-on indication message is corresponding to the standby indication message and is used to notify the first intelligent home device that the second intelligent home device has switched to the working state, the first intelligent home device does not need to keep in communication with the third-party server corresponding to the intelligent service application of the second intelligent home device, and the first intelligent home device needs to end a network heartbeat service with the third-party server corresponding to the intelligent service application of the second intelligent home device.

According to the standby method provided by the present invention, a second intelligent home device acquires an IP address of a first intelligent home device by means of automatic discovery, receives a standby request entered by a user, sends a standby indication message to the first intelligent home device according to the IP address of the first intelligent home device, switches from a working state to a standby state according to the standby request, receives a wake-up request sent by the first intelligent home device, and switches from the standby state to the working state according to the wake-up request. Standby of an intelligent home device that has a simple process and does not need participation of a third-party server is implemented, thereby overcoming a defect in the prior art that implementation of network standby of an intelligent home device is complex and needs participation of a third-party server.

Embodiment 3

Figure 3:
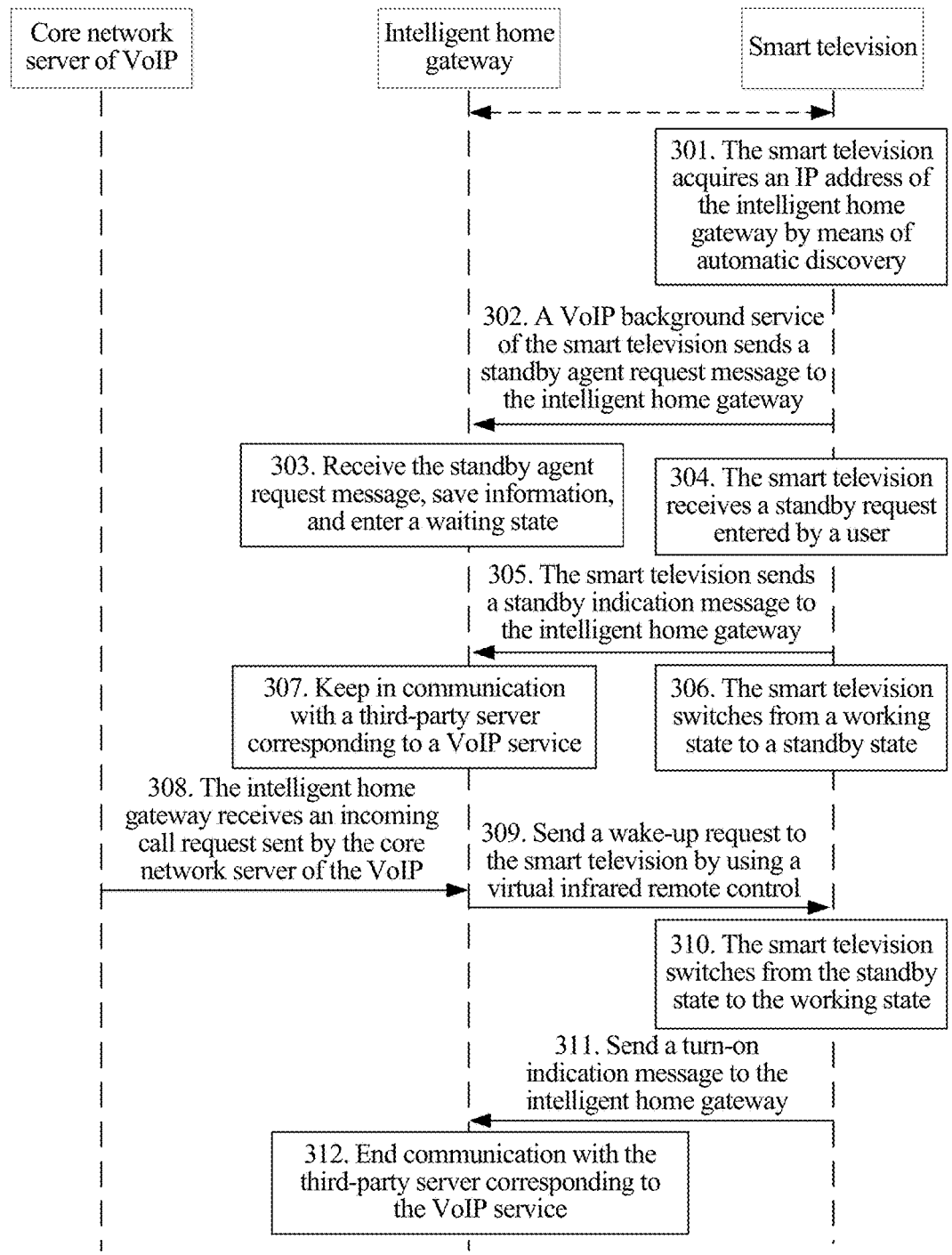
FIG. 3 is a schematic flowchart of still another standby method according to an embodiment of the present invention.

Embodiment 3 of the present invention provides still another standby method. A smart television is used as a second intelligent home device, and an intelligent home gateway is used as a first intelligent home device. A process that the intelligent home gateway agents a Voice over Internet Protocol (VoIP) service of the smart television by means of interaction between the smart television and the intelligent home gateway is used as an example to describe in detail the standby methods shown in FIG. 1 and FIG. 2. Referring to FIG. 3, the method may include the following steps:

301. The smart television acquires an IP address of the intelligent home gateway by means of automatic discovery.

For example, automatic discovery between the smart television and the intelligent home gateway is implemented by using the UPNP protocol, and the smart television may acquire the IP address of the intelligent home gateway.

302. A VoIP background service of the smart television sends a standby agent request message to the intelligent home gateway.

The standby agent request message includes an IP address of the smart television, a service identifier of the VoIP service, and a port number corresponding to the VoIP service.

303. The intelligent home gateway receives the standby agent request message, saves information, and enters a waiting state.

The intelligent home gateway saves, into a preset correspondence according to the received standby agent request message, the IP address of the smart television, the service identifier of the VoIP service, and the port number corresponding to the VoIP service that are included in the standby agent request message.

304. The smart television receives a standby request entered by a user.

For example, a user who uses the smart television enters the standby request according to requirements of the user by using an on/off button of a remote control of the smart television or an on/off button on the smart television.

305. The smart television sends a standby indication message to the intelligent home gateway.

For example, after receiving the standby request entered by the user, the smart television needs to send, to the intelligent home gateway, the standby indication message that is used to notify the intelligent home gateway that the smart television is to enter a standby state soon.

306. The smart television switches from a working state to a standby state.

For example, after the smart television switches from the working state to the standby state, only a central processing unit of the smart television is powered, and the rest part is not powered. Certainly, a specific standby solution may be set according to actual requirements, which is not specifically limited by the present invention.

307. The intelligent home gateway agents an IP address of the smart television, a service identifier of the VoIP service, and a port number corresponding to the VoIP service, and keeps in communication with a third-party server corresponding to the VoIP service.

After the intelligent home gateway agents the IP address of the smart television, the service identifier of the VoIP service, and the port number corresponding to the VoIP service, and keeps in communication with the third-party server corresponding to the VoIP service, the intelligent home gateway receives information sent to the smart television by the third-party server corresponding to the VoIP service.

308. The intelligent home gateway receives an incoming call request sent by a core network server of the VoIP.

The incoming call request includes the service identifier of the VoIP service and the port number corresponding to the VoIP service.

For example, when a user initiates a call service request to a VoIP service account bound to the smart television, the core network server of the VoIP receives the call service request and sends an incoming call request to the smart television. Because the intelligent home gateway agents the VoIP service of the smart television, the intelligent home gateway receives the incoming call request sent by the core network server of the VoIP.

309. The intelligent home gateway sends a wake-up request to the smart television by using a virtual infrared remote control.

Specifically, the intelligent home gateway queries the preset correspondence according to the service identifier of the VoIP service and the port number corresponding to the VoIP service that are included in the incoming call request, so as to acquire the IP address of the smart television that is corresponding to the service identifier of the VoIP service and the port number corresponding to the VoIP service that are included in the incoming call request.

The intelligent home gateway sends the wake-up request to the smart television by using the virtual infrared remote control.

310. The smart television switches from the standby state to the working state.

The smart television switches from the standby state to the working state after receiving the wake-up request sent by the intelligent home gateway, and processes the incoming call request sent by the core network server of the VoIP.

311. The smart television sends a turn-on indication message to the intelligent home gateway.

When switching from the standby state to the working state after receiving the wake-up request, the smart television sends the turn-on indication message to the intelligent home gateway to instruct the intelligent home gateway to cancel agenting for an intelligent service application of the smart television.

312. The intelligent home gateway ends communication with the third-party server corresponding to the VoIP service.

When the intelligent home gateway receives the turn-on indication message sent by the smart television, the intelligent home gateway ends communication with the third-party server corresponding to the VoIP service.

According to the standby method provided by the present invention, an intelligent home device smart television acquires an IP address of an intelligent home gateway by means of automatic discovery. A VoIP background service of the smart television sends a standby agent request message to the intelligent home gateway. The smart television receives a standby request entered by a user and switches from a working state to a standby state, and sends a standby indication message to the intelligent home gateway according to the IP address of the intelligent home gateway; the intelligent home gateway keeps in communication with a third-party server corresponding to a VoIP service. If receiving a service request sent by the third-party server of the VoIP service, the intelligent home gateway sends a wake-up request to the smart television according to the service request and a preset correspondence, to wake up the smart television. The smart television switches from the standby state to the working state according to the wake-up request. Standby of an intelligent home device that has a simple process and does not need participation of a third-party server is implemented, thereby overcoming a defect in the prior art that implementation of network standby of an intelligent home device is complex and needs participation of a third-party server.

Embodiment 4

Figure 4:
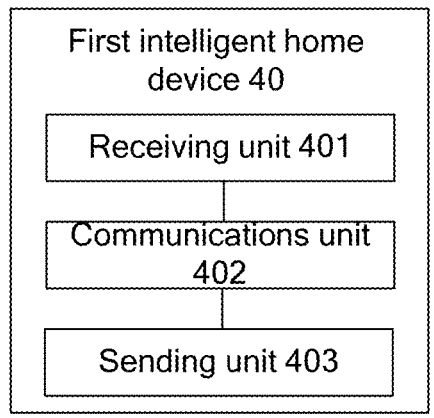
FIG. 4 is a schematic structural diagram of a first intelligent home device according to an embodiment of the present invention.

Embodiment 4 of the present invention provides a first intelligent home device 40. Referring to FIG. 4, the first intelligent home device 40 may include:

a receiving unit 401, configured to receive a standby indication message sent by a second intelligent home device;

a communications unit 402, configured to keep in communication with a third-party server corresponding to an intelligent service application of the second intelligent home device, where the receiving unit 401 may be further configured to receive a service request sent by the third-party server; and a sending unit 403, configured to: if a first service request sent by the third-party server is received, send a wake-up request to the second intelligent home device according to the first service request and a preset correspondence, to wake up the second intelligent home device, where the first service request includes a service identifier of a first intelligent service application and a port number corresponding to the first intelligent service application, the first intelligent service application is an intelligent service application that runs on the second intelligent home device, and the preset correspondence includes a service identifier of at least one intelligent service application, a port number corresponding to the at least one intelligent service application, and an IP address of an intelligent home device corresponding to the intelligent service application.

It should be noted that the first intelligent home device may be an intelligent home gateway or any intelligent home device that has a gateway function. A type of the first intelligent home device is not specifically limited by the present invention.

The second intelligent home device is any one of all intelligent home devices that are connected to the first intelligent home device.

It should be noted that an intelligent home device described in all embodiments of the present invention may be a smart television or a smart set top box in a home local area network, or may be a network camera or the like in a home local area network, which is not specifically limited in the embodiments of the present invention and shall fall within the protection scope of the present invention.

The standby indication message is sent by the second intelligent home device and is used to notify the first intelligent home device that the second intelligent home device is to switch to a standby state soon, and that the first intelligent home device needs to enter a waiting state and prepare to keep in communication with the third-party server corresponding to the intelligent service application of the second intelligent home device.

An intelligent service application is an intelligent service provided by an intelligent home device and may include a real-time communication service, a video call service, a Voice over Internet Protocol service, and the like. A type of the intelligent service application is not specifically limited by the present invention.

The third-party server is a service provider of the intelligent service application of the second intelligent home device. The third-party server may include a server in a real-time communication service, may include a mobile phone terminal in a screen shifting service, or may include a third-party server corresponding to another intelligent service application, which is not specifically limited by the present invention.

Keeping in communication with the third-party server corresponding to the intelligent service application of the second intelligent home device is performed according to a service identifier of the intelligent service application of the second intelligent home device and a port number corresponding to the intelligent service application. Manners of keeping in communication with the third-party server corresponding to the intelligent service application of the second intelligent home device vary with manners in which the first intelligent home device obtains the intelligent service application of the second intelligent home device. Specifically, keeping in communication with the third-party server corresponding to the intelligent service application of the second intelligent home device may be implemented in any one of the following three manners:

Manner 1: The service identifier of the intelligent service application of the second intelligent home device and the port number corresponding to the intelligent service application are manually entered by a user as a preset correspondence of the first intelligent home device when a home network is created. After the first intelligent home device receives the standby indication message sent by the second intelligent home device, the first intelligent home device starts to keep in communication with a third-party server corresponding to each intelligent service application of the second intelligent home device.

Manner 2: The standby indication message sent by the second intelligent home device includes an IP address of the second intelligent home device, a service identifier of at least one intelligent service application, and a port number corresponding to the at least one intelligent service application. After the first intelligent home device receives the standby indication message sent by the second intelligent home device, the first intelligent home device keeps, according to the standby indication message, in communication with a third-party server corresponding to the intelligent service application that is corresponding to the service identifier of the intelligent service application and the port number corresponding to the intelligent service application that are included in the standby indication message.

It should be noted that in manner 2, the first intelligent home device agents a related service according to the service identifier of the intelligent service application and the port number corresponding to the intelligent service application that are included in the standby indication message; the standby indication message may include some intelligent service applications of the second intelligent home device, or may include all applications of the second intelligent home device, which is not specifically limited by the present invention.

Manner 3: Before sending the standby indication message, the second intelligent home device sends a standby agent request message to the first intelligent home device, where the standby agent request message includes an IP address of the second intelligent home device, a service identifier of at least one intelligent service application, and a port number corresponding to the at least one intelligent service application. After the first intelligent home device receives the standby indication message sent by the second intelligent home device, the first intelligent home device keeps, according to the standby agent request message, in communication with a third-party server corresponding to the intelligent service application that is corresponding to the service identifier of the intelligent service application and the port number corresponding to the intelligent service application that are included in the standby agent request message.

It should be noted that in manner 3, the first intelligent home device agents a related service according to the service identifier of the intelligent service application and the port number corresponding to the intelligent service application that are included in the standby agent request message. The standby agent request message may include some intelligent service applications of the second intelligent home device, or may include all applications of the second intelligent home device, which is not specifically limited by the present invention.

Further, the sending unit 403 may be specifically configured to:

query the preset correspondence according to the service identifier of the first intelligent service application and the port number corresponding to the first intelligent service application that are included in the first service request received by the receiving unit 401, so as to acquire, from the preset correspondence, an IP address of the second intelligent home device corresponding to the service identifier of the first intelligent service application and the port number corresponding to the first intelligent service application; and send the wake-up request to the second intelligent home device according to the IP address of the second intelligent home device, to wake up the second intelligent home device.

The first service request includes the service identifier of the first intelligent service application and the port number corresponding to the first intelligent service application. The first intelligent service application is any one of intelligent service applications that run on the second intelligent home device. The preset correspondence includes a service identifier of at least one intelligent service application, a port number corresponding to the at least one intelligent service application, and an IP address of an intelligent home device corresponding to the intelligent service application.

After the first intelligent home device keeps in communication with the third-party server corresponding to the intelligent service application of the second intelligent home device, the first intelligent home device receives a service request sent by the third-party server.

If receiving the first service request sent by the third-party server, the first intelligent home device sends the wake-up request to the second intelligent home device according to the first service request and the preset correspondence, to wake up the second intelligent home device.

Optionally, the standby indication message may include:
the IP address of the second intelligent home device, a service identifier of at least one intelligent service application, and a port number corresponding to the at least one intelligent service application.

Figure 5:
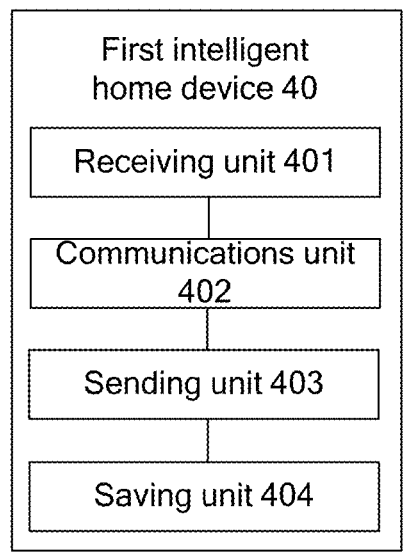
FIG. 5 is a schematic structural diagram of another first intelligent home device according to an embodiment of the present invention.

Correspondingly, referring to FIG. 5, the first intelligent home device 40 may further include:
a saving unit 404, configured to save, into the preset correspondence, the IP address of the second intelligent home device, the service identifier of the at least one intelligent service application, and the port number corresponding to the at least one intelligent service application that are included in the standby indication message.

Further, the communications unit 402 may be specifically configured to:
keep, according to the standby indication message, in communication with a third-party server corresponding to the intelligent service application that is corresponding to the service identifier of the intelligent service application and the port number corresponding to the intelligent service application that are included in the standby indication message.

Optionally, the receiving unit 401 may be further configured to:
receive a standby agent request message sent by the second intelligent home device, where the standby agent request message includes the IP address of the second intelligent home device, a service identifier of at least one intelligent service application, and a port number corresponding to the at least one intelligent service application.

Correspondingly, the saving unit 404 may be further configured to save, into the preset correspondence, the IP address of the second intelligent home device, the service identifier of the at least one intelligent service application, and the port number corresponding to the at least one intelligent service application that are included in the standby agent request message received by the receiving unit 401.

Optionally, the communications unit 402 may be specifically configured to:
keep, according to the standby agent request message, in communication with a third-party server corresponding to the intelligent service application that is corresponding to the service identifier of the intelligent service application and the port number corresponding to the intelligent service application that are included in the standby agent request message.

Further, the sending unit 403 may be specifically configured to:
if the second intelligent home device is connected to the first intelligent home device by using an FE or GE interface, send a wake-up packet to the second intelligent home device according to a standby protocol, to wake up the second intelligent home device; or if the second intelligent home device is connected to the first intelligent home device by using a WiFi interface, send a wake-up request to the second intelligent home device by using a network wake-up function of a WiFi standard protocol, to wake up the second intelligent home device; or if the first intelligent home device is integrated with an infrared remote control or 2.4G wireless remote control function, send a wake-up request to the second intelligent home device by using an analog remote control corresponding to the infrared remote control or 2.4G wireless remote control function, to wake up the second intelligent home device.

Further, the receiving unit 401 may be further configured to receive a turn-on indication message sent by the second intelligent home device.

The communications unit 402 may be further configured to end communication with the third-party server corresponding to the intelligent service application of the second intelligent home device.

The first intelligent home device 40 provided by the present invention receives a standby indication message sent by a second intelligent home device; keeps in communication with a third-party server corresponding to an intelligent service application of the second intelligent home device; and if receiving a first service request sent by the third-party server, sends a wake-up request to the second intelligent home device according to the first service request and a preset correspondence, to wake up the second intelligent home device. The first service request includes a service identifier of a first intelligent service application and a port number corresponding to the first intelligent service application. The first intelligent service application is an intelligent service application that runs on the second intelligent home device. The preset correspondence includes a service identifier of at least one intelligent service application, a port number corresponding to the at least one intelligent service application, and an IP address of an intelligent home device corresponding to the intelligent service application. Standby of an intelligent home device that has a simple process and does not need participation of a third-party server is implemented, thereby overcoming a defect in the prior art that implementation of network standby of an intelligent home device is complex and needs participation of a third-party server.

Embodiment 5

Figure 6:
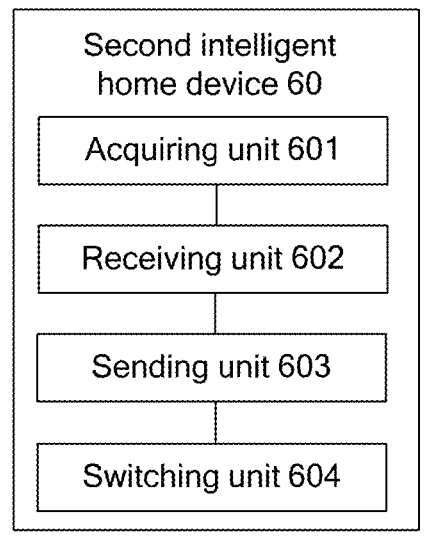
FIG. 6 is a schematic structural diagram of a second intelligent home device according to an embodiment of the present invention.

Embodiment 5 of the present invention provides a second intelligent home device 60. Referring to FIG. 6, the second intelligent home device 60 may include:
an acquiring unit 601, configured to acquire an IP address of a first intelligent home device by means of automatic discovery;
a receiving unit 602, configured to receive a standby request entered by a user;
a sending unit 603, configured to send a standby indication message to the first intelligent home device according to the IP address of the first intelligent home device, so that the first intelligent home device keeps in communication with a third-party server corresponding to an intelligent service application of the second intelligent home device; and
a switching unit 604, configured to switch from a working state to a standby state according to the standby request received by the receiving unit 602.

The receiving unit 602 may be further configured to receive a wake-up request sent by the first intelligent home device.

The switching unit 604 may be further configured to switch from the standby state to the working state according to the wake-up request received by the receiving unit 602.

Optionally, the standby indication message may include: an IP address of the second intelligent home device, a service identifier of at least one intelligent service application, and a port number corresponding to the at least one intelligent service application.

Optionally, the sending unit 603 may be further configured to:

send a standby agent request message to the first intelligent home device, where the standby agent request message includes an IP address of the second intelligent home device, a service identifier of at least one intelligent service application, and a port number corresponding to the at least one intelligent service application.

Further, the receiving unit 602 may be specifically configured to:

if the second intelligent home device is connected to the first intelligent home device by using an FE or GE interface, receive a wake-up packet sent by the first intelligent home device according to a standby protocol; or if the second intelligent home device is connected to the first intelligent home device by using a WiFi interface, receive a wake-up request sent by the first intelligent home device by using a network wake-up function of a WiFi standard protocol; or if the first intelligent home device is integrated with an infrared remote control or 2.4G wireless remote control function, receive a wake-up request sent by the first intelligent home device by using an analog remote control corresponding to the infrared remote control or 2.4G wireless remote control function.

Further, the sending unit 603 may be further configured to:

send a turn-on indication message to the first intelligent home device, so that the first intelligent home device ends agenting for the intelligent service application of the second intelligent home device.

The second intelligent home device 60 provided by the present invention acquires an IP address of a first intelligent home device by means of automatic discovery; receives a standby request entered by a user; sends a standby indication message to the first intelligent home device according to the IP address of the first intelligent home device; switches from a working state to a standby state according to the standby request; receives a wake-up request sent by the first intelligent home device; and switches from the standby state to the working state according to the wake-up request. Standby of an intelligent home device that has a simple process and does not need participation of a third-party server is implemented, thereby overcoming a defect in the prior art that implementation of network standby of an intelligent home device is complex and needs participation of a third-party server.

Embodiment 6

Figure 7:
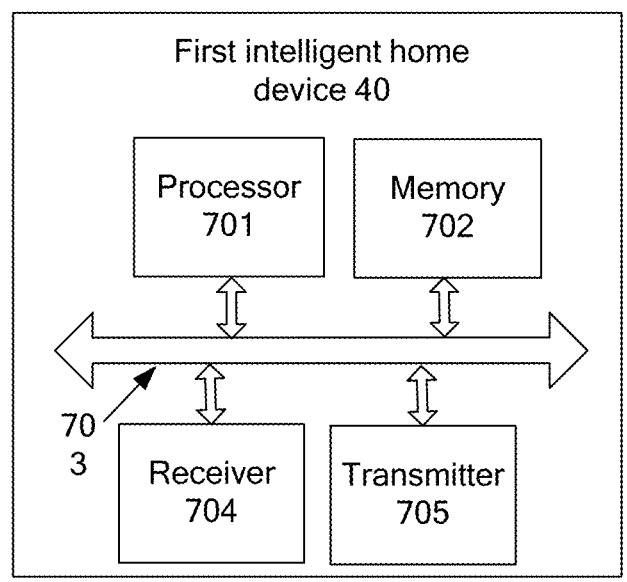
FIG. 7 is a schematic structural diagram of another first intelligent home device according to an embodiment of the present invention.

Embodiment 6 of the present invention provides another first intelligent home device 40. Referring to FIG. 7, the first intelligent home device 40 may include:

at least one processor 701; a memory 702; at least one communications bus 703, configured to implement a connection and intercommunication among the processor 701, the memory 702, and another module that is not shown; a receiver 704; and a transmitter 705.

The communications bus 703 may be an industry standard architecture (ISA) bus, a peripheral component interconnect (PCI) bus, an extended industry standard architecture (EISA) bus, or the like. The bus 703 may include an address bus, a data bus, a control bus, and the like. For convenience of denotation, only one thick line is used in FIG. 7 to indicate the bus; however, it does not indicate that there is only one bus or only one type of buses.

The memory 702 may include a read-only memory and a random access memory, and provides an instruction and data for the processor 701. Apart of the memory 702 may further include a nonvolatile random access memory (NVRAM).

The processor 701 may be a CPU, an application-specific integrated circuit (ASIC), or one or more integrated circuits configured to implement this embodiment of the present invention.

The receiver 704 is configured to receive a standby indication message sent by a second intelligent home device.

The processor 701 is configured to keep in communication with a third-party server corresponding to an intelligent service application of the second intelligent home device.

The receiver 704 is further configured to receive a service request sent by the third-party server.

The transmitter 705 is configured to: if a first service request sent by the third-party server is received, send a wake-up request to the second intelligent home device according to the first service request and a preset correspondence, to wake up the second intelligent home device, where the first service request includes a service identifier of a first intelligent service application and a port number corresponding to the first intelligent service application, the first intelligent service application is an intelligent service application that runs on the second intelligent home device, and the preset correspondence includes a service identifier of at least one intelligent service application, a port number corresponding to the at least one intelligent service application, and an IP address of an intelligent home device corresponding to the intelligent service application.

Further, the transmitter 705 may be specifically configured to:

query the preset correspondence according to the service identifier of the first intelligent service application and the port number corresponding to the first intelligent service application that are included in the first service request received by the receiver 704, so as to acquire, from the preset correspondence, an IP address of the second intelligent home device corresponding to the service identifier of the first intelligent service application and the port number corresponding to the first intelligent service application; and send the wake-up request to the second intelligent home device according to the IP address of the second intelligent home device, to wake up the second intelligent home device.

Optionally, the standby indication message may include: the IP address of the second intelligent home device, a service identifier of at least one intelligent service application, and a port number corresponding to the at least one intelligent service application.

Correspondingly, the processor 701 may be further configured to:

save, into the preset correspondence, the IP address of the second intelligent home device, the service identifier of the at least one intelligent service application, and the port number corresponding to the at least one intelligent service application that are included in the standby indication message.

Further, the processor 701 maybe specifically configured to:

keep, according to the standby indication message, in communication with a third-party server corresponding to the intelligent service application that is corresponding to the service identifier of the intelligent service application and the port number corresponding to the intelligent service application that are included in the standby indication message.

Optionally, the receiver 704 may be further configured to:

receive a standby agent request message sent by the second intelligent home device, where the standby agent request message includes the IP address of the second intelligent home device, a service identifier of at least one intelligent service application, and a port number corresponding to the at least one intelligent service application.

Correspondingly, the processor 701 may be further configured to:

save, into the preset correspondence, the IP address of the second intelligent home device, the service identifier of the at least one intelligent service application, and the port number corresponding to the at least one intelligent service application that are included in the standby agent request message received by the receiver 704.

Further, the processor 701 maybe specifically configured to:

keep, according to the standby agent request message, in communication with a third-party server corresponding to the intelligent service application that is corresponding to the service identifier of the intelligent service application and the port number corresponding to the intelligent service application that are included in the standby agent request message.

Optionally, the transmitter 705 may be specifically configured to:

if the second intelligent home device is connected to the first intelligent home device by using an FE or GE interface, send a wake-up packet to the second intelligent home device according to a standby protocol, to wake up the second intelligent home device; or if the second intelligent home device is connected to the first intelligent home device by using a WiFi interface, send a wake-up request to the second intelligent home device by using a network wake-up function of a WiFi standard protocol, to wake up the second intelligent home device; or if the first intelligent home device is integrated with an infrared remote control or 2.4G wireless remote control function, send a wake-up request to the second intelligent home device by using an analog remote control corresponding to the infrared remote control or 2.4G wireless remote control function, to wake up the second intelligent home device.

Further, the receiver 704 may be further configured to receive a turn-on indication message sent by the second intelligent home device.

The processor 705 may be further configured to end communication with the third-party server corresponding to the intelligent service application of the second intelligent home device.

The first intelligent home device 40 provided by the present invention receives a standby indication message sent by a second intelligent home device; keeps in communication with a third-party server corresponding to an intelligent service application of the second intelligent home device; and if receiving a first service request sent by the third-party server, sends a wake-up request to the second intelligent home device according to the first service request and a preset correspondence, to wake up the second intelligent home device. The first service request includes a service identifier of a first intelligent service application and a port number corresponding to the first intelligent service application. The first intelligent service application is an intelligent service application that runs on the second intelligent home device. The preset correspondence includes a service identifier of at least one intelligent service application, a port number corresponding to the at least one intelligent service application, and an IP address of an intelligent home device corresponding to the intelligent service application. Standby of an intelligent home device that has a simple process and does not need participation of a third-party server is implemented, thereby overcoming a defect in the prior art that implementation of network standby of an intelligent home device is complex and needs participation of a third-party server.

Embodiment 7

Figure 8:
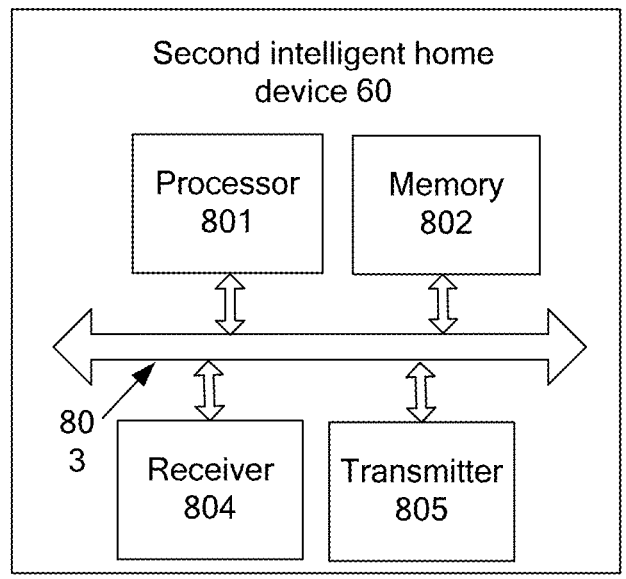
FIG. 8 is a schematic structural diagram of another second intelligent home device according to an embodiment of the present invention.

Embodiment 7 of the present invention provides another second intelligent home device 60. Referring to FIG. 8, the second intelligent home device 60 may include:

at least one processor 801; a memory 802; at least one communications bus 803, configured to implement a connection and intercommunication among the processor 801, the memory 802, and another module that is not shown; a receiver 804; and a transmitter 805.

The communications bus 803 may be an ISA bus, a PCI bus, an EISA bus, or the like. The bus 803 may include an address bus, a data bus, a control bus, and the like. For convenience of denotation, only one thick line is used in FIG. 8 to indicate the bus; however, it does not indicate that there is only one bus or only one type of buses.

The memory 802 may include a read-only memory and a random access memory, and provides an instruction and data for the processor 801. Apart of the memory 802 may further include a nonvolatile random access memory (NVRAM).

The processor 801 may be a CPU, an ASIC, or one or more integrated circuits configured to implement this embodiment of the present invention.

The processor 801 is configured to acquire an IP address of a first intelligent home device by means of automatic discovery.

The receiver 804 is configured to receive a standby request entered by a user.

The transmitter 805 is configured to send a standby indication message to the first intelligent home device according to the IP address of the first intelligent home device, so that the first intelligent home device keeps in communication with a third-party server corresponding to an intelligent service application of the second intelligent home device 60.

The processor 801 is further configured to switch from a working state to a standby state according to the standby request received by the receiver 804.

The receiver 804 is further configured to receive a wake-up request sent by the first intelligent home device.

The processor 801 is further configured to switch from the standby state to the working state according to the wake-up request received by the receiver 804.

Optionally, the standby indication message may include:

an IP address of the second intelligent home device 60, a service identifier of at least one intelligent service application, and a port number corresponding to the at least one intelligent service application.

Optionally, the transmitter 805 maybe further configured to:

send a standby agent request message to the first intelligent home device, where the standby agent request message includes an IP address of the second intelligent home device 60, a service identifier of at least one intelligent service application, and a port number corresponding to the at least one intelligent service application.

Optionally, the receiver 804 may be specifically configured to:

if the second intelligent home device 60 is connected to the first intelligent home device by using an FE or GE interface, receive a wake-up packet sent by the first intelligent home device according to a standby protocol; or if the second intelligent home device 60 is connected to the first intelligent home device by using a WiFi interface, receive a wake-up request sent by the first intelligent home device by using a network wake-up function of a WiFi standard protocol; or if the first intelligent home device is integrated with an infrared remote control or 2.4G wireless remote control function, receive a wake-up request sent by the first intelligent home device by using an analog remote control corresponding to the infrared remote control or 2.4G wireless remote control function.

Further, the transmitter 805 may be further configured to:

send a turn-on indication message to the first intelligent home device, so that the first intelligent home device ends agenting for the intelligent service application of the second intelligent home device 60.

The second intelligent home device 60 provided by the present invention acquires an IP address of a first intelligent home device by means of automatic discovery; receives a standby request entered by a user; sends a standby indication message to the first intelligent home device according to the IP address of the first intelligent home device; switches from a working state to a standby state according to the standby request; receives a wake-up request sent by the first intelligent home device; and switches from the standby state to the working state according to the wake-up request. Standby of an intelligent home device that has a simple process and does not need participation of a third-party server is implemented, thereby overcoming a defect in the prior art that implementation of network standby of an intelligent home device is complex and needs participation of a third-party server.

Embodiment 8

Figure 9:
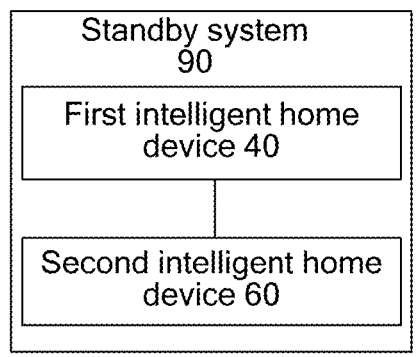
FIG. 9 is a schematic structural diagram of a standby system according to an embodiment of the present invention.

Embodiment 8 of the present invention provides a standby system 90. Referring to FIG. 9, the standby system 90 may include:

at least one first intelligent home device 40 according to any one of the foregoing embodiments; and at least one second intelligent home device 60 according to any one of the foregoing embodiments.

Optionally, the second intelligent home device 60 may be connected to the first intelligent home device 40 by using a fast Ethernet FE or Gigabit Ethernet GE interface; or the second intelligent home device 60 may be connected to the first intelligent home device 40 by using a WiFi interface; or the first intelligent home device 40 may be integrated with an infrared remote control or 2.4G wireless remote control function, and the second intelligent home device 60 is connected to the first intelligent home device 40 by using the infrared remote control or 2.4G wireless remote control function.

It should be noted that, when the second intelligent home device 60 is in a standby state, and the first intelligent home device 40 agents an intelligent service application of the second intelligent home device 60, according to the connection manners of the second intelligent home device 60 and the first intelligent home device 40 or according to a function that the first intelligent home device 40 has, when the first intelligent home device 40 receives a service request and needs to wake up the second intelligent home device 60, sending a wake-up request to the second intelligent home device 60 to wake up the second intelligent home device 60 may be implemented in any one of the following three manners:

Manner 1: If the second intelligent home device 60 is connected to the first intelligent home device 40 by using an FE or GE interface, the first intelligent home device 40 sends a wake-up packet to the second intelligent home device according to a standby protocol, to wake up the second intelligent home device.

The wake-up packet may include six consecutive bytes of FF and consecutive 16 repetitions of a MAC address.

It should be noted that content of the wake-up packet is determined according to an actually used standby protocol, which is not specifically limited by the present invention.

Manner 2: If the second intelligent home device 60 is connected to the first intelligent home device 40 by using a WiFi interface, the first intelligent home device 40 sends a wake-up packet to the second intelligent home device by using a network wake-up function of a WiFi standard protocol, to wake up the second intelligent home device.

Manner 3: If the first intelligent home device 40 is integrated with an infrared remote control or 2.4G wireless remote control function, the first intelligent home device 40 sends a wake-up request to the second intelligent home device by using an analog remote control corresponding to the infrared remote control or 2.4G wireless remote control function, to wake up the second intelligent home device.

The standby system 90 provided by the present invention includes the first intelligent home device 40 and the second intelligent home device 60. The first intelligent home device 40 receives a standby indication message sent by the second intelligent home device; keeps in communication with a third-party server corresponding to an intelligent service application of the second intelligent home device; and if receiving a first service request sent by the third-party server, sends a wake-up request to the second intelligent home device according to the first service request and a preset correspondence, to wake up the second intelligent home device. The first service request includes a service identifier of a first intelligent service application and a port number corresponding to the first intelligent service application. The first intelligent service application is an intelligent service application that runs on the second intelligent home device. The preset correspondence includes a service identifier of at least one intelligent service application, a port number corresponding to the at least one intelligent service application, and an IP address of an intelligent home device corresponding to the intelligent service application. Standby of an intelligent home device that has a simple process and does not need participation of a third-party server is implemented, thereby overcoming a defect in the prior art that implementation of network standby of an intelligent home device is complex and needs participation of a third-party server.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components maybe combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, maybe located in one position, or may be distributed on a plurality of network units . Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A standby method, applied to a first intelligent home device, the method comprising:
    receiving a standby indication message sent by a second intelligent home device;
    keeping in communication with a third-party server corresponding to an intelligent service application of the second intelligent home device; and
    if a first service request sent by the third-party server is received, sending a wake-up request to the second intelligent home device according to the first service request and a preset correspondence, to wake up the second intelligent home device, wherein the first service request comprises a service identifier of a first intelligent service application and a port number corresponding to the first intelligent service application, the first intelligent service application is an intelligent service application that runs on the second intelligent home device, and the preset correspondence comprises a service identifier of at least one intelligent service application, a port number corresponding to the at least one intelligent service application, and an Internet Protocol (IP) address of an intelligent home device corresponding to the at least one intelligent service application.

2. The standby method according to claim 1, wherein sending a wake-up request to the second intelligent home device according to the first service request and a preset correspondence, to wake up the second intelligent home device comprises:
    querying the preset correspondence according to the service identifier of the first intelligent service application and the port number corresponding to the first intelligent service application that are comprised in the first service request, so as to acquire, from the preset correspondence, an IP address of the second intelligent home device that is corresponding to the service identifier of the first intelligent service application and the port number corresponding to the first intelligent service application; and
    sending the wake-up request to the second intelligent home device according to the IP address of the second intelligent home device, to wake up the second intelligent home device.

3. The standby method according to claim 1, wherein:
    the standby indication message comprises: the IP address of the second intelligent home device, the service identifier of at least one intelligent service application, and the port number corresponding to the at least one intelligent service application; and
    the method further comprises:
    saving, into the preset correspondence, the IP address of the second intelligent home device, the service identifier of the at least one intelligent service application, and the port number corresponding to the at least one intelligent service application that are comprised in the standby indication message.

4. The standby method according to claim 3, wherein keeping in communication with a third-party server corresponding to an intelligent service application of the second intelligent home device comprises:
    keeping, according to the standby indication message, in communication with a third-party server corresponding to the at least one intelligent service application that is corresponding to the service identifier of the at least one intelligent service application and the port number corresponding to the at least one intelligent service application that are comprised in the standby indication message.

5. The standby method according to claim 1, wherein before receiving a standby indication message sent by a second intelligent home device, the method further comprises:
    receiving a standby agent request message sent by the second intelligent home device, wherein the standby agent request message comprises the IP address of the second intelligent home device, the service identifier of at least one intelligent service application, and the port number corresponding to the at least one intelligent service application; and saving, into the preset correspondence, the IP address of the second intelligent home device, the service identifier of the at least one intelligent service application, and the port number corresponding to the at least one intelligent service application that are comprised in the standby agent request message.

6. The standby method according to claim 5, wherein keeping in communication with a third-party server corresponding to an intelligent service application of the second intelligent home device comprises:
keeping, according to the standby agent request message, in communication with a third-party server corresponding to the at least one intelligent service application that is corresponding to the service identifier of the at least one intelligent service application and the port number corresponding to the at least one intelligent service application that are comprised in the standby agent request message.

7. The standby method according to claim 1, further comprising:
receiving a turn-on indication message sent by the second intelligent home device; and
ending communication with the third-party server corresponding to the intelligent service application of the second intelligent home device.

8. A standby method, applied to a second intelligent home device, the method comprising:
acquiring an Internet Protocol (IP) address of a first intelligent home device by means of automatic discovery;
receiving a standby request entered by a user;
sending a standby indication message to the first intelligent home device according to the IP address of the first intelligent home device, so that the first intelligent home device keeps in communication with a third-party server corresponding to an intelligent service application of the second intelligent home device;
switching from a working state to a standby state according to the standby request;
receiving a wake-up request sent by the first intelligent home device; and
switching from the standby state to the working state according to the wake-up request.

9. The standby method according to claim 8, wherein the standby indication message comprises:
an IP address of the second intelligent home device, a service identifier of at least one intelligent service application, and a port number corresponding to the at least one intelligent service application.

10. The standby method according to claim 8, wherein before sending a standby indication message to the first intelligent home device according to the IP address of the first intelligent home device, the method further comprises:
sending a standby agent request message to the first intelligent home device, wherein the standby agent request message comprises an IP address of the second intelligent home device, the service identifier of at least one intelligent service application, and the port number corresponding to the at least one intelligent service application.

11. The standby method according to claim 8, further comprising:
sending a turn-on indication message to the first intelligent home device.

12. A first intelligent home device, comprising:
a receiver, configured to receive a standby indication message sent by a second intelligent home device;
a processor, configured to keep in communication with a third-party server corresponding to an intelligent service application of the second intelligent home device;
wherein the receiver, further configured to receive a service request sent by the third-party server; and
a transmitter, configured to: if a first service request sent by the third-party server is received, send a wake-up request to the second intelligent home device according to the first service request and a preset correspondence, to wake up the second intelligent home device, where the first service request includes a service identifier of a first intelligent service application and a port number corresponding to the first intelligent service application, the first intelligent service application is an intelligent service application that runs on the second intelligent home device, and the preset correspondence includes a service identifier of at least one intelligent service application, a port number corresponding to the at least one intelligent service application, and an Internet Protocol (IP) address of an intelligent home device corresponding to the at least one intelligent service application.

13. The first intelligent home device according to claim 12, wherein the transmitter is configured to:
query the preset correspondence according to the service identifier of the first intelligent service application and the port number corresponding to the first intelligent service application that are comprised in the first service request received by the receiver, so as to acquire, from the preset correspondence, an IP address of the second intelligent home device corresponding to the service identifier of the first intelligent service application and the port number corresponding to the first intelligent service application; and
send the wake-up request to the second intelligent home device according to the IP address of the second intelligent home device, to wake up the second intelligent home device.

14. The first intelligent home device according to claim 12, wherein the standby indication message comprises:
the IP address of the second intelligent home device, the service identifier of at least one intelligent service application, and the port number corresponding to the at least one intelligent service application; the processor, further configured to save, into the preset correspondence, the IP address of the second intelligent home device, the service identifier of the at least one intelligent service application, and the port number corresponding to the at least one intelligent service application that are comprised in the standby indication message.

15. The first intelligent home device according to claim 14, wherein the processor is configured to:
keep, according to the standby indication message, in communication with a third-party server corresponding to the at least one intelligent service application that is corresponding to the service identifier of the at least one intelligent service application and the port number corresponding to the at least one intelligent service application that are comprised in the standby indication message.

16. The first intelligent home device according to claim 12, wherein:
the receiver is further configured to:
receive a standby agent request message sent by the second intelligent home device, wherein the standby agent request message comprises the IP address of the second intelligent home device, the service identifier of at least one intelligent service application, and the port number corresponding to the at least one intelligent service application; and the processor is further configured to:
save, into the preset correspondence, the IP address of the second intelligent home device, the service identifier of the at least one intelligent service application, and the port number corresponding to the at least one intelligent service application that are comprised in the standby agent request message received by the receiver unit.

17. The first intelligent home device according to claim 16, wherein the processor is configured to:
keep, according to the standby agent request message, in communication with a third-party server corresponding to the at least one intelligent service application that is corresponding to the service identifier of the at least one intelligent service application and the port number corresponding to the at least one intelligent service application that are comprised in the standby agent request message.

18. The first intelligent home device according to claim 12, wherein:
the receiver is further configured to receive a turn-on indication message sent by the second intelligent home device; and
the processor is further configured to end communication with the third-party server corresponding to the intelligent service application of the second intelligent home device.

19. A second intelligent home device, comprising:
a processor, configured to acquire an Internet Protocol (IP) address of a first intelligent home device by means of automatic discovery;
a receiver, configured to receive a standby request entered by a user;
a transmitter, configured to send a standby indication message to the first intelligent home device according to the IP address of the first intelligent home device, so that the first intelligent home device keeps in communication with a third-party server corresponding to an intelligent service application of the second intelligent home device;
wherein the processor, further configured to switch from a working state to a standby state according to the standby request received by the receiver;
the receiver is further configured to receive a wake-up request sent by the first intelligent home device; and
the processor is further configured to switch from the standby state to the working state according to the wake-up request received by the receiver.

20. The second intelligent home device according to claim 19, wherein the transmitter is further configured to:
send a standby agent request message to the first intelligent home device, wherein the standby agent request message comprises an IP address of the second intelligent home device, a service identifier of at least one intelligent service application, and a port number corresponding to the at least one intelligent service application.

* * * * *